United States Patent [19]

Haraguchi et al.

[11] Patent Number: 5,661,191
[45] Date of Patent: Aug. 26, 1997

[54] EXPANDABLE RUBBER-MODIFIED STYRENE RESIN BEADS, EXPANDED BEADS THEREOF, AND EXPANDED MOLDED ARTICLES OBTAINED THEREFROM

[75] Inventors: Kenji Haraguchi; Takanori Suzuki; Mitsuo Furuichi; Hiromi Yamanaka; Masayuki Tanaka, all of Mie, Japan

[73] Assignee: Mitsubishi Chemical BASF Company Limited, Yokkaichi, Japan

[21] Appl. No.: 576,561

[22] Filed: Dec. 21, 1995

[30] Foreign Application Priority Data

Jan. 13, 1995 [JP] Japan ................................. 7-004383
Oct. 4, 1995 [JP] Japan ................................. 7-257666

[51] Int. Cl.$^6$ ........................... C08J 9/16; C08J 9/18
[52] U.S. Cl. ..................... 521/59; 521/60; 521/139; 521/146; 428/304.4
[58] Field of Search ........................... 521/59, 60, 139, 521/146; 428/304.4

[56] References Cited

U.S. PATENT DOCUMENTS

| | | | |
|---|---|---|---|
| 4,282,334 | 8/1981 | Walter et al. | 525/53 |
| 4,307,134 | 12/1981 | Milkovich et al. | 427/222 |
| 4,333,970 | 6/1982 | Blommers et al. | 427/222 |
| 4,363,881 | 12/1982 | Smith | 521/56 |
| 4,409,338 | 10/1983 | DiGiulio | 521/59 |
| 4,692,471 | 9/1987 | Fudge | 521/59 |
| 4,937,272 | 6/1990 | Sumitomo | 521/59 |

FOREIGN PATENT DOCUMENTS

| | | |
|---|---|---|
| 0682078 | 11/1995 | European Pat. Off. . |
| 4427014 | 2/1995 | Germany . |
| 6-228357 | 8/1994 | Japan . |
| WO94/25516 | 11/1994 | WIPO . |

*Primary Examiner*—Helen Lee
*Attorney, Agent, or Firm*—Oblon, Spivak, McClelland, Maier & Neustadt, P.C.

[57] ABSTRACT

Expandable rubber-modified styrene resin beads, expanded rubber-modified styrene resin beads, and expanded molded rubber-modified styrene resin articles are described. The expandable beads comprise a rubber-modified styrene resin comprising a styrene resin having dispersed therein 8 to 15% by weight of conjugated diene rubber particles having a 1,4-cis structure in a proportion of not less than 70% and an average particle size of 1.5 to 3.0 μm, the rubber-modified styrene resin having a mineral oil content of not more than 3.0% by weight, and the expandable rubber-modified styrene resin beads containing 1 to 15% by weight of a volatile blowing agent. The expanded molded article has excellent appearance, impact resistance and softness.

6 Claims, No Drawings

EXPANDABLE RUBBER-MODIFIED STYRENE RESIN BEADS, EXPANDED BEADS THEREOF, AND EXPANDED MOLDED ARTICLES OBTAINED THEREFROM

FIELD OF THE INVENTION

This invention relates to expandable rubber-modified styrene resin beads for obtaining expanded beads suitable as expanded molded articles excellent in outer appearance, impact resistance, and softness; and expanded beads and expanded molded articles obtained from the expandable beads.

BACKGROUND OF THE INVENTION

Polystyrene foam exhibits excellent cushioning, heat insulating properties, and easy molding and is widely employed as packaging material or heat insulating material. However, it is liable to partially break off due to insufficient impact resistance or softness so that it is unsuitable for, for example, packaging of precision components. Although expanded polyolefin resins have excellent impact resistance and softness, they require large-scale productive facilities, and they must be, by nature, transported from a manufacturer to a molder in the form of expanded beads, which incurs increase of production cost.

In recent years, expanded materials obtained from a rubber-modified styrene resin which is prepared by bulk polymerization or suspension polymerization of a styrene monomer in the presence of butadiene rubber as a base resin have been proposed for easy molding and improved impact resistance and softness over the conventional polystyrene resin foam, as disclosed in JP-B-47-18428 (the term "JP-B" as used herein means an "examined published Japanese patent application") and JP-B-51-46536. However, the degree of the improvements in these materials is still insufficient.

SUMMARY OF THE INVENTION

The inventors of the present invention have conducted extensive investigations to solve the above problems and found, as a result, that expandable rubber-modified styrene resin beads comprised of a specific rubber component and a styrene resin and having a limited mineral oil content provide expanded resin beads which provide expanded molded articles having excellent appearance, impact resistance and softness, and thus completed the present invention.

The present invention relates to expandable rubber-modified styrene resin beads comprising a rubber-modified styrene resin comprising a styrene resin having dispersed therein 8 to 15% by weight of a rubber component consisting of a conjugated diene rubber having a 1,4-cis structure in a proportion of not less than 70%, said conjugated diene rubber having a form of particles having an average particle size of 1.5 to 3.0 μm, said rubber-modified styrene resin having a mineral oil content of not more than 3.0% by weight, and said expandable rubber-modified styrene resin beads containing 1 to 15% by weight of a volatile blowing agent.

It is preferable that the styrene resin has a Z-average molecular weight of 350,000 or more.

It is preferable that the expandable rubber-modified styrene resin beads have an internal water content of not more than 0.2% by weight.

It is preferable that the volatile blowing agent consists mainly of butane.

It is preferable that the expandable rubber-modified styrene resin beads further contain at least one organic solvent selected from the group consisting of hydrocarbons and carboxylic acid esters having a boiling point of not lower than 80° C.

The present invention further relates to expanded rubber-modified styrene resin beads obtained by heat expanding the above-mentioned expandable rubber-modified styrene resin beads.

The present invention furthermore relates to an expanded molded article having a density of 10 to 600 kg/m$^3$ which comprises the above-mentioned expanded rubber-modified styrene resin beads.

DETAILED DESCRIPTION OF THE INVENTION

The expandable rubber-modified styrene resin beads of the present invention comprise a styrene resin having dispersed therein 8 to 15% by weight of a rubber component consisting of a particulate conjugated diene rubber having a 1,4-cis structure in a proportion of not less than 70% and an average particle size of 1.5 to 3.0 μm.

The rubber component in the rubber-modified styrene resin consists of a conjugated diene rubber having a 1,4-cis structure in a proportion of not less than 70%, preferably not less than 80%, still preferably not less than 90%. If proportion of the 1,4-cis structure is too low, expanded molded articles obtained from the resulting rubber-modified styrene resin have insufficient softness or insufficient impact resistance.

Conjugated diene rubbers having a 1,4-cis structure in a proportion of not less than 70% can be obtained by, for example, coordination ionic polymerization of a conjugated diene in the presence of a rare earth metal (atomic number 21, 39, 57 to 62) catalyst, preferably a cerium group (atomic number 57 to 62) catalyst. The rare earth metal catalyst basically comprises (a) a rare earth metal compound represented by formula $MR_3$ (wherein M is a rare earth element; and R is a reactive residue of an organic acid), (b) an organoaluminum compound, and (c) a halogen compound. The organic acid which constitutes the rare earth metal compound includes organic compounds having an active hydrogen atom displaceable with a rare earth metal, such as carboxylic acids, alcohols, and amines (refer to JP-A-55-66903 (the term "JP-A" as used herein means an "unexamined published Japanese patent application") and JP-A-60-23406).

The proportion of a 1,4-cis structure in the conjugated diene rubber is a proportion of a 1,4-cis structure in the total carbon-carbon double bonds in the conjugated diene rubber, which can be determined by $^{13}$C-NMR spectroscopy.

The conjugated diene rubber may be obtained either by homopolymerization of a conjugated diene monomer, such as butadiene, isoprene or chloroprene, or copolymerization of an appropriate combination of these monomers. Rubber obtained by homopolymerization of butadiene is preferred for ease in grafting styrene thereto and its bulk availability on an industrial scale.

The conjugated diene rubber content in the rubber-modified styrene resin is 8 to 15% by weight, preferably 10 to 13% by weight, still preferably 11 to 13% by weight. If the conjugated diene rubber content is less than 8% by weight, sufficient softness and impact resistance cannot be obtained. If it exceeds 15% by weight, no further improvement in strength is obtained, and expanded beads obtained therefrom have considerably deteriorated moldability only to provide an expanded molded article suffering surface melt, etc.

The particulate conjugated diene rubber has a particle size of 1.5 to 3.0 μm, preferably 2.0 to 2.8 μm. If the particle size is less than 1.5 μm, insufficiency in impact resistant can result. If it exceeds 3.0 μm, the beads fail to form cells in a stable manner and are liable to shrink.

The average particle size is dependent on various factors, such as the type of a stirrer of a polymerization vessel for styrene polymerization, the number of revolution of the stirrer, the stirring time, and the polymerization temperature, and is not decided by control of a single factor. The average particle size falling within the above range can be secured by adjusting such conditions as impose shear stress on rubber during polymerization, such as the number of revolution for stirring.

In the present invention, the average particle size of dispersed particles of the conjugated diene rubber is calculated from the following equation based on the measurement of the particle diameter of 100 to 200 rubber particles in a transmission electron micrograph:

Average particle size=$\Sigma N_i D^2 / \Sigma N_i D$ (wherein Ni represents the number of rubber particles; and D represents the diameter of a rubber particle)

The styrene resin in the rubber-modified styrene resin preferably has a Z-average molecular weight of 350,000 or more, still preferably 400,000 or more. If the Z-average molecular weight is smaller than 350,000, the resulting expanded material tends to have poor impact resistance or softness.

The expandable rubber-modified styrene resin beads of the present invention have a mineral oil content of not more than 3.0% by weight, preferably not more than 2.0% by weight, based on the rubber-modified styrene resin and contains 1 to 15% by weight, preferably 3 to 10% by weight, of a volatile blowing agent.

If the mineral oil content in the beads exceeds 3.0% by weight, the resulting expanded material is apt to undergo shrinkage or deformation.

The expandable rubber-modified styrene resin beads preferably has an internal water content of not more than 0.2% by weight, still preferably not more than 0.1% by weight. If the internal water content in the beads exceeds 0.2% by weight, the expanded beads would have a reduced cell size and tend to undergo melting or shrinkage on the surface of a molded article while they are expansion molded only to provide poor appearance. Further, in the case where beads having a high internal water content are used in combination with butane which is known as such a volatile blowing agent as has excellent molding properties, the cells of the heat-expanded beads become very fine, and molded articles obtained therefrom tend to have deteriorated appearance. Such being the case, it is difficult to use butane as a main component of a blowing agent, so that there is often no choice but to use n-pentane which does not make cells so fine. However, use of n-pentane as a blowing agent is limited if increased productivity is aimed at; for the cooling time after heating the expanded beads in a mold is relatively long although the appearance of molded articles is improved. The above problem can be solved by controlling the internal water content. That is, with the so controlled internal water content, molded articles having a satisfactory appearance can be obtained while increasing productivity.

A combination of butane and an organic compound having a boiling point of not higher than 80° C., such as propane, n-pentane, isopentane, neopentane, cyclopentane, hexane, trichlorofluoromethane, dichlorodifluoromethane, dichlorotetrafluoroethane, chloromethane, chloroethane, dichloromethane, methanol, and diethyl ether, may be used as volatile blowing agent. Where the above-described internal water content is 0.2% by weight or less, a mixture containing butane (a hydrocarbon compound having 4 carbon atoms, i.e., n-butane, isobutane, etc.) as a main component, that is, in a proportion of at least 50% by weight is preferred for maintenance of sufficient foaming properties and reduction of the molding cycle. A mixed blowing agent consisting of about 70% of n-butane and about 30% of isobutane is industrially available.

Further, a mixed blowing agent containing at least one organic solvent selected from the group consisting of hydrocarbons and carboxylic acid esters having a boiling point of not lower than 80° C., especially in an amount of not more than 1% by weight, is preferred for obtaining increased foaming properties. Examples of useful hydrocarbons having a boiling point of not lower than 80° C. are cyclohexane, heptane, octane, xylene, toluene, and ethylbenzene, with cyclohexane being particularly preferred for its safety. Examples of useful carboxylic acid esters having a boiling point of not lower than 80° C. are dioctyl phthalate, diheptyl phthalate, dioctyl adipate, and diethylene glycol dibenzoate. Addition of these organic solvents in an amount exceeding 1% by weight is rather unfavorable because the necessary cooling time in a molding cycle would be increased, tending to fail to accomplish the object of the present invention.

The rubber-modified styrene resin which can be used in the present invention is obtained by dissolving the aforesaid specific conjugated diene rubber in a styrene monomer, such as styrene, p-methylstyrene, and α-methylstyrene, and subjecting the monomer mixture to bulk polymerization, solution polymerization, suspension polymerization, bulk-suspension polymerization, and the like in the presence of an azo compound, such as azobisisobutyronitrile, or a peroxide, such as benzoyl peroxide or t-butyl peroxybenzoate.

The rubber-modified styrene resin may further contain inorganic fillers, such as talc, clay, calcium carbonate and titanium oxide; antioxidants, antistatic agents, ultraviolet absorbers; lubricants, such as carbon black, aluminum stearate, zinc stearate and aluminum p-t-butylbenzoate; and flame retarders, such as tris(dibromopropyl) phosphate, pentabromodiphenyl ether, tetrabromobutane, dibromoethylbenzole, and 1,2,5,6,9,10-hexabromocyclodecane.

The expandable rubber-modified styrene resin can be obtained by, for example, a process comprising pelletizing a melt-kneaded compound from an extruder by strand cutting, underwater cutting, hot cutting, etc. to obtain rubber-modified styrene resin pellets having a pellet size of 0.5 to 5 mm, dispersing the pellets in an aqueous medium in the presence of a suspending agent in a closed vessel to impregnate a blowing agent into the pellets; or a process comprising thoroughly melt-kneading the compound together with a blowing agent in an extruder, extruding the compound through the nozzles of the die tip and immediately leading the extruded strands into water for quenching, and granulating as unexpanded.

In particular, expandable rubber-modified styrene resin of the present invention having a controlled internal water content and capable of providing molded article with excellent appearance can be obtained by a process comprising pelletizing a melt-kneaded compound from an extruder by strand cutting, underwater cutting, hot cutting, etc. to obtain rubber-modified styrene resin pellets having a pellet size of 0.5 to 5 mm, dispersing the pellets in an aqueous medium in the presence of a suspending agent in a closed vessel, and impregnating a blowing agent into the pellets in the presence of 0.01 to 2.0 mol/l, based on the aqueous medium, of an electrolyte.

The expandable rubber-modified styrene resin beads of the present invention is expanded by heating to obtain rubber-modified styrene resin expanded beads. Heat expansion of the expandable resin beads can be carried out by, for example, heating with steam, etc. to a temperature near the glass transition point of the rubber-modified styrene resin (about 100° C.).

The resulting expanded rubber-modified styrene resin beads can be molded by means of a molding machine used for the production of polystyrene expanded molded articles. In more detail, expanded beads are charged in a mold, fusing the expanded beads together by steam heating, and, after cooling for a prescribed time period, removing the expanded molded article from the mold. The molding of the expanded beads of the present invention can be completed in a reduced cooling time, and the resulting molded article has an expansion ratio of 50 and, after being allowed to stand at 23° C. for 24 hours from removal from the mold, exhibits excellent impact resistance as having 50% failure height of 35 to 45 cm, excellent softness of 50 to 80 mm, and excellent appearance in good balance, as demonstrated in Examples hereinafter described.

The present invention will now be illustrated in greater detail with reference to Examples, but it should be understood that the present invention is not construed as being limited thereto.

EXAMPLE 1

A rubber-modified styrene resin shown in Table 1 below, which contained a rubber component consisting of 100% butadiene rubber as conjugated diene rubber was melted in a single-screw extruder having a bore diameter of 30 mm and pelletized by underwater cutting to obtain spherical beads each weighing 1.4 mg. In a 3 liter autoclave equipped with a stirrer were charged 600 g of the resulting rubber-modified styrene resin beads, 900 g of ion-exchanged water, 4.0 g of sodium pyrophosphate, 8.0 g of magnesium sulfate, 0.45 g of sodium dodecylsulfate, and 9.0 g of sodium sulfate. The contents were heated up to 120° C. over 1 hour. On reaching 120° C., 58 g of pentane was added thereto. The contents were kept at 120° C. for 10 hours and then cooled to 30° C. The pentane added consisted of 80% of n-pentane and 20% of isopentane.

The expandable rubber-modified styrene resin beads were taken out of the autoclave, and magnesium pyrophosphate adhered on the surface were removed by dissolving with nitric acid. The beads were washed with water and centrifuged. The collected beads were put in a cylindrical metal container having an inner diameter of 10 cm and a height of 25 cm with its both ends closed with a metal net having an opening of 0.1 mm and dried by blowing dried nitrogen gas at 20° C. through the cylinder from the bottom at a flow rate of 500 l/min for 10 minutes.

A hundred parts by weight of the resulting expandable rubber-modified styrene resin beads were mixed with 0.06 part by weight of zinc stearate as anti-blocking agent and 0.04 part by weight of a bis(hydroxyethyl)alkylamine as antistatic agent. The thus coated beads were put in a 30 liter batch pre-expander, expander, and steam was blown therein from the lower part under a pressure of 1.0 kgf/cm² to obtain thermally expanded rubber-modified styrene resin beads weighing 20 kg per m³.

The resulting expanded beads were filled into a mold, heated by steam under a pressure of 0.7 kgf/cm² for 20 seconds, cooled with water for 5 seconds, and allowed to cool for a prescribed period of time to obtain an expanded molded article.

The rubber particle size, butadiene content, microstructure of the butadiene rubber, and Z-average molecular weight of the rubber-modified styrene resin, and the internal water content and amount and composition of the volatile blowing agent in the above-obtained expandable resin beads, the outer appearance of the expanded molded article, the time of allowing the expanded molded article to cool (cooling time), and the compression strength, flexural strength, impact strength (50% failure height), and softness of the expanded molded article were evaluated according to the following methods.

Measurement of Rubber Particle Size of Rubber-Modified Styrene Resin:

The particle diameter of 100 to 200 rubber particles on a transmission electron micrograph was measured, and an average particle size was calculated from $\Sigma NiD^2/\Sigma NiD$ (wherein Ni represents the number of rubber particles; and D represents the diameter of a rubber particle).

Determination of Butadiene Content and Microstructure of Butadiene Rubber:

The rubber-modified styrene resin was dissolved in chloroform-D in a concentration of 10% by weight and subjected to $^{13}$C-NMR spectroscopy at 67.8 MHz using tetramethylsilane as an internal standard ($\delta 0.0$ ppm) to determine the butadiene content and the microstructure of the butadiene rubber.

Measurement of Z-Average Molecular Weight:

The rubber-modified styrene resin was dissolved in a 0.25% by weight solution of chloroform. Any insoluble matter was removed by filtration, and the filtrate was subjected to gel permeation chromatography.

Measurement of Internal Water Content:

After dried, the expandable rubber-modified styrene resin beads were dissolved in dried toluene, and the water content was measured by a Karl Fischer's method.

Measurement of Amount of Volatile Blowing Agent:

A weighed sample was heated at 120° C. for 4 hours and reweighed. The ratio (%) of the weight loss on heating to the sample weight before heating was taken as amount of the volatile blowing agent.

Composition of Volatile Blowing Agent:

One gram of a sample was dissolved in 20 ml of dimethylformamide and subjected to gas chromatography to determine the composition of the blowing agent.

Outer Appearance:

The appearance of the expanded molded article was visually observed and evaluated according to the following rating system.

A . . . Shrink, melt or gaps are hardly observed.

B . . . Shrink, melt or gaps are observed.

C . . . Considerable shrink, melt or gaps are observed.

Cooling Time:

The time necessary for a molded article to have equal thickness to the internal dimension of the mold (50.7 mm). If the cooling time is shorter than necessary, the molded article would be oversized after removal from the mold.

Compression Strength:

A 50 mm long, 50 mm wide and 25 mm thick test piece cut out of the expanded molded article was applied to a compression test according to JIS Z0234 to measure a compression strength (kgf/cm$^2$).

Flexural Strength:

A flexural strength (kgf/cm$^2$) of a 300 mm long, 75 mm wide and 25 mm thick test piece cut out of the expanded molded article was measured in accordance with JIS A 9511.

50% Failure Height:

Fifty (50) % failure height means the height which causes the failure of 50% of the number of test pieces tested in a falling weight impact test. A steel ball weighing 255 g was fallen on a 200 mm long, 40 mm wide and 25 mm thick test piece cut out of the expanded molded article, and 50% failure height was measured in accordance with JIS K7211.

Softness:

The expanded molded article was cut into a test piece of 200 mm in length, 30 mm in width and 20 mm in thickness. The central part of the test piece was applied to the circumferential surface of a cylinder having a diameter varying from 10 mm up to 100 mm by 10 mm, and both ends of the test piece were bent around the cylinder in about 5 seconds. The testing was repeated, while changing the diameter of the cylinder starting from 100 mm in a decreasing order until the test piece was broken. The diameter of the cylinder with which the test piece was broken was recorded. The softness of the test piece was evaluated from an average (mm) of measured values of 10 test pieces per sample. The smaller the value, the more excellent the softness.

EXAMPLES 2 AND 3 AND COMPARATIVE EXAMPLES 1 TO 3

The same procedure as in Example 1 was repeated except for using the rubber-modified styrene resin whose composition (exclusive of a blowing agent) is shown in Tables 1 and 3.

The results obtained in the foregoing Examples and Comparative Examples are shown in Tables 2 and 4 below.

EXAMPLE 4

The rubber-modified styrene resin shown in Table 1 was melted in a single-screw extruder having a bore diameter of 30 mm and pelletized by means of an under water cutter into spherical beads each weighing about 1.4 mg. In a 3 liter autoclave equipped with a stirrer were charged 600 g of the resulting resin beads, 900 g of ion-exchanged water, 4.0 g of sodium pyrophosphate, 8.0 g of magnesium sulfate, 0.45 g of sodium dodecylsulfate, and 9.0 g of sodium sulfate, and heated up to 100° C. over 1 hour. On reaching 100° C., 23 g of pentane and 40 g of butane were added thereto, and the mixture was kept at that temperature for 5 hours. The temperature was raised to 120° C. over 2 hours, at which the mixture was maintained for 2 hours, followed by cooling to 30° C. The resulting expandable rubber-modified styrene resin beads were processed in the same manner as in Example 1. The results obtained are shown in Table 2.

The pentane used above consisted of 80% of n-pentane and 20% of isopentane, and the butane used above consisted of 70% of n-butane and 30% of isobutane.

EXAMPLE 5

The same procedure as in Example 4 was repeated except for altering the composition of the rubber-modified styrene resin as shown in Table 2 below. The results obtained are also shown in Table 2.

EXAMPLE 6

The same procedure as in Example 4 was repeated except for using 22 g of pentane and 38 g of butane as blowing agent and further using 7 g of cyclohexane. The results obtained are shown in Table 2.

EXAMPLE 7

The same procedure as in Example 4 was repeated except for using 54 g of butane as blowing agent and further using 7 g of cyclohexane. The results obtained are shown in Table 2.

EXAMPLE 8

The same procedure as in Example 4 was repeated except for using 72 g of butane as blowing agent. The results obtained are shown in Table 2.

EXAMPLE 9

In a 3 liter autoclave equipped with a stirrer were charged 600 g of the same resin beads as used in Example 4, 900 g of ion-exchanged water, 4.5 g of tricalcium phosphate, and 0.027 g of sodium dodecylbenzenesulfonate, and treated in the same manner as in Example 4. The results obtained are shown in Table 2.

COMPARATIVE EXAMPLES 4 TO 6

The same procedure as in Example 4 was repeated except for using the rubber-modified styrene resin shown in Table 3. The results obtained are shown in Table 4.

TABLE 1

| | Example No. | | | | | | | | |
|---|---|---|---|---|---|---|---|---|---|
| | 1 | 2 | 3 | 4 | 5 | 6 | 7 | 8 | 9 |
| Resin Composition: | | | | | | | | | |
| Butadiene content (%) | 9 | 9 | 12 | 12 | 9 | 12 | 12 | 12 | 12 |
| Proportion of cis form (%) | 96 | 81 | 94 | 98 | 96 | 98 | 98 | 98 | 98 |
| Rubber particle size (μm) | 2.0 | 2.2 | 2.6 | 2.6 | 2.0 | 2.6 | 2.6 | 2.6 | 2.6 |
| Mineral oil content (%) | 0.2 | 1.0 | 1.0 | 1.0 | 0.2 | 1.0 | 1.0 | 1.0 | 1.0 |
| Z-Average molecular weight (×10$^{-4}$) | 37 | 45 | 45 | 43 | 37 | 43 | 43 | 43 | 43 |
| Expandable Resin: | | | | | | | | | |
| Internal water content (%) | 0.04 | 0.05 | 0.02 | 0.01 | 0.03 | 0.02 | 0.03 | 0.04 | 0.26 |
| Volatile blowing agent content (%) | 7.0 | 6.6 | 6.7 | 7.2 | 7.0 | 7.0 | 7.2 | 7.9 | 7.3 |

TABLE 1-continued

| | Example No. | | | | | | | | |
|---|---|---|---|---|---|---|---|---|---|
| | 1 | 2 | 3 | 4 | 5 | 6 | 7 | 8 | 9 |
| Composition of blowing agent (%): | | | | | | | | | |
| isobutane | — | — | — | 19.1 | 18.2 | 17.8 | 33.3 | 34.1 | 18.4 |
| n-butane | — | — | — | 39.3 | 37.5 | 35.5 | 66.7 | 65.9 | 38.3 |
| isopentane | 19.1 | 19.0 | 19.7 | 8.2 | 8.8 | 9.3 | 0.0 | 0.0 | 7.4 |
| n-pentane | 80.9 | 81.0 | 80.3 | 33.4 | 35.5 | 37.4 | 0.0 | 0.0 | 35.9 |
| Organic solvent (cyclohexane) (%) | 0.0 | 0.0 | 0.0 | 0.0 | 0.0 | 0.8 | 0.9 | 0.0 | 0.0 |

TABLE 2

| | Example No. | | | | | | | | |
|---|---|---|---|---|---|---|---|---|---|
| | 1 | 2 | 3 | 4 | 5 | 6 | 7 | 8 | 9 |
| Expansion ratio | 50 | 50 | 50 | 50 | 50 | 50 | 50 | 50 | 50 |
| Outer appearance | A | A | A | A | A | A | A | A | B |
| Cooling time (sec) | 112 | 122 | 120 | 57 | 63 | 101 | 82 | 20 | 58 |
| 5% Compression strength (kgf/cm$^2$) | 1.0 | 1.0 | 0.9 | 1.0 | 1.2 | 1.1 | 1.1 | 1.1 | 1.0 |
| Flexural strength (kgf/cm$^2$) | 2.6 | 2.5 | 2.5 | 2.6 | 2.6 | 2.6 | 2.7 | 2.6 | 2.6 |
| 50% failure height (cm) | 38 | 41 | 42 | 41 | 38 | 42 | 41 | 39 | 39 |
| Softness (mm) | 76 | 67 | 54 | 63 | 74 | 56 | 63 | 66 | 66 |

TABLE 3

| | Comparative Example No. | | | | | |
|---|---|---|---|---|---|---|
| | 1 | 2 | 3 | 4 | 5 | 6 |
| Resin Composition: | | | | | | |
| Butadiene content (%) | 8 | 5 | 9 | 8 | 8 | 9 |
| Proportion of cis form (%) | 92 | 92 | 93 | 96 | 27 | 93 |
| Rubber particle size (μm) | 3.5 | 2.1 | 2.6 | 1.1 | 2.2 | 2.5 |
| Mineral oil content (%) | 0.2 | 0.5 | 4.0 | 0.2 | 0.2 | 4.0 |
| Z-Average molecular weight (×10$^{-4}$) | 48 | 39 | 45 | 32 | 42 | 40 |
| Expandable Resin: | | | | | | |
| Internal water content (%) | 0.04 | 0.01 | 0.02 | 0.02 | 0.04 | 0.03 |
| Volatile blowing agent content (%) | 7.1 | 7.3 | 6.7 | 7.1 | 7.4 | 6.7 |
| Blowing agent composition: | | | | | | |
| isobutane | — | — | — | 18.1 | 19.3 | 18.8 |
| n-butane | — | — | — | 36.2 | 40.2 | 38.7 |
| isopentane | 18.9 | 18.5 | 19.0 | 9.1 | 6.9 | 8.3 |
| n-pentane | 81.1 | 81.5 | 81.0 | 36.6 | 33.6 | 34.2 |
| Organic solvent (cyclohexane) (%) | 0.0 | 0.0 | 0.0 | 0.0 | 0.0 | 0.0 |

TABLE 4

| | Comparative Example No. | | | | | |
|---|---|---|---|---|---|---|
| | 1 | 2 | 3 | 4 | 5 | 6 |
| Expansion ratio | 40 | 50 | 30 | 50 | 50 | 45 |
| Outer appearance | B | A | C | A | A | C |
| Cooling time (sec) | — | 113 | — | 71 | 69 | — |
| 5% Compression strength (kgf/cm$^2$) | — | 1.3 | — | 1.2 | 1.1 | — |
| Flexural strength (kgf/cm$^2$) | — | 3.1 | — | 2.5 | 2.8 | — |
| 50% failure height (cm) | — | 28 | — | 31 | 30 | — |
| Softness (mm) | — | 98 | — | 92 | 93 | — |

As is apparent from the results shown in Table 2 in view of the results of Table 4, the expandable rubber-modified styrene resin beads obtained in Examples 1 to 9 which satisfy all the requirements of the present invention provide expanded molded articles excellent in appearance and strength.

It is seen, on the other hand, that the expanded molded articles obtained by using the rubber-modified styrene resin of Comparative Example 4, in which the dispersed conjugated diene rubber particles are undersized; of Comparative Example 5, in which the conjugated diene rubber has a low proportion of a 1,4-cis structure; or of Comparative Example 2, in which the conjugated diene rubber content is small; are inferior in falling ball impact strength or softness. It is also seen that the expandable resin of Comparative Example 1, in which the rubber particle size is oversized, undergoes slight shrinkage after molding and that the expandable resins of Comparative Examples 3 and 6, which have a mineral oil content of 4% by weight, undergo serious shrinkage after molding and therefore have poor expansion moldability.

It was proved that the required cooling time in Examples 4 to 9, in which butane was used as a main blowing agent, is shorter than that in Examples 1 to 3 in which pentane was used as a sole blowing agent. The expanded molded article of Example 9, in which the internal water content of the expandable resin beads was over 0.2% by weight, had slightly deteriorated appearance, i.e., cave-ins on the surface due to melt of part of the expanded beads.

As described above, the expandable rubber-modified styrene resin according to the present invention provides expanded molded articles having excellent appearance and strength. In particular, the expandable rubber-modified styrene resin with its internal water content controlled and containing butane as a main blowing agent is advantageous in that cooling time required in a molding cycle can be reduced.

While the invention has been described in detail and with reference to specific embodiments thereof, it will be apparent to one skilled in the art that various changes and modifications can be made therein without departing from the spirit and scope thereof.

What is claimed is:

1. Expandable rubber-modified styrene resin beads comprising a rubber-modified styrene resin comprising a styrene resin having dispersed therein 8 to 15% by weight of a rubber component consisting of a conjugated diene rubber having a 1,4-cis structure in a proportion of not less than 70%, said styrene resin having a Z-average molecular weight of 350,000 or more, said conjugated diene rubber having a form of particles having an average particle size of 1.5 to 3.0 μm, said rubber-modified styrene resin having a mineral oil content of not more than 3.0% by weight, and said expandable rubber-modified styrene resin beads containing 1 to 15% by weight of a volatile blowing agent.

2. Expandable rubber-modified styrene resin beads according to claim 1, wherein said expandable rubber-modified styrene resin beads have an internal water content of not more than 0.2% by weight.

3. Expandable rubber-modified styrene resin beads according to claim 1, wherein said volatile blowing agent consists mainly of butane.

4. Expandable rubber-modified styrene resin beads according to claim 1, wherein said expandable rubber-modified styrene resin beads further contain at least one organic solvent selected from the group consisting of hydrocarbons and carboxylic acid esters having a boiling point of not lower than 80° C.

5. Expanded rubber-modified styrene resin beads obtained by heat expanding expandable rubber-modified styrene resin beads comprising a rubber-modified styrene resin which comprises a styrene resin having dispersed therein 8 to 15% by weight of a rubber component consisting of a conjugated diene rubber having a 1,4-cis structure in a proportion of not less than 70%, said conjugated diene rubber having a form of particles having an average particle size of 1.5 to 3.0 μm, said rubber-modified styrene resin having a mineral oil content of not more than 3.0% by weight, and said expandable rubber-modified styrene resin beads containing 1 to 15% by weight of a volatile blowing agent.

6. An expanded molded article comprising expanded rubber-modified styrene resin beads and having a density of 10 to 600 kg/m$^3$, said expanded rubber-modified styrene resin being obtained by heat expanding expandable rubber-modified styrene resin beads comprising a rubber-modified styrene resin comprising a styrene resin having dispersed therein 8 to 15% by weight of a rubber component consisting of a conjugated diene rubber having a 1,4-cis structure in a proportion of not less than 70%, said conjugated diene rubber having a form of particles having an average particle size of 1.5 to 3.0 μm, said rubber-modified styrene resin having a mineral oil content of not more than 3.0% by weight, and said expandable rubber-modified styrene resin beads containing 1 to 1,5% by weight of a volatile blowing agent.

* * * * *